(12) United States Patent
Hernstedt

(10) Patent No.: US 10,244,688 B2
(45) Date of Patent: Apr. 2, 2019

(54) METHOD FOR INSTALLING IRRIGATION DRIP LINE COUPLERS

(71) Applicant: Daniel Hernstedt, Wasco, CA (US)

(72) Inventor: Daniel Hernstedt, Wasco, CA (US)

( * ) Notice: Subject to any disclaimer, the term of this patent is extended or adjusted under 35 U.S.C. 154(b) by 147 days.

(21) Appl. No.: 15/594,460

(22) Filed: May 12, 2017

(65) Prior Publication Data

US 2017/0245445 A1 Aug. 31, 2017

Related U.S. Application Data

(62) Division of application No. 14/497,206, filed on Sep. 25, 2014, now Pat. No. 9,655,310.

(51) Int. Cl.
*B23Q 3/10* (2006.01)
*A01G 25/02* (2006.01)

(52) U.S. Cl.
CPC .......... *A01G 25/026* (2013.01); *Y02A 40/237* (2018.01)

(58) Field of Classification Search
CPC ... B23Q 3/00; B23Q 3/06; B23P 11/00; B23P 11/005; B23P 11/027
See application file for complete search history.

(56) References Cited

U.S. PATENT DOCUMENTS

| | | | |
|---|---|---|---|
| 3,119,174 A | 1/1964 | Wokeck | |
| 4,017,958 A | 4/1977 | Diggs | |
| 4,226,457 A | 10/1980 | Shutt | |
| 4,341,002 A | 7/1982 | Diba | |
| 4,522,339 A | 6/1985 | Costa | |
| 5,177,846 A | 1/1993 | Bryant | |
| D357,162 S | 4/1995 | Chacon | |
| 5,438,743 A | 8/1995 | Simington et al. | |
| 5,722,142 A | 3/1998 | Myers | |
| 5,875,535 A * | 3/1999 | Canoy | B25B 27/04 29/275 |
| 6,351,881 B1 | 3/2002 | Peckich et al. | |
| 6,409,152 B1 | 6/2002 | Bagley | |
| 6,928,708 B1 | 8/2005 | Larock | |
| 6,994,322 B1 * | 2/2006 | Wittman | A44B 15/005 254/131 |
| D589,313 S * | 3/2009 | Engelke | D8/34 |
| 7,946,010 B1 | 5/2011 | Myers et al. | |
| 7,971,329 B1 * | 7/2011 | Brohard | B25B 27/04 254/131 |
| 8,127,387 B2 | 3/2012 | Tygh | |
| 8,328,164 B2 * | 12/2012 | Feiler | A01K 59/00 254/131 |
| 2008/0157040 A1 * | 7/2008 | Hironaga | B25C 9/00 254/21 |
| 2009/0114891 A1 | 5/2009 | Metz | |

* cited by examiner

*Primary Examiner* — Lee D Wilson
(74) *Attorney, Agent, or Firm* — James M. Duncan, Esq.; Klein Denatlae Goldner

(57) ABSTRACT

A method for utilizing a tool for installing drip tubes to main drip lines with a coupler. The tool may have an integral body which serves several functions in installing drip tubes to main drip lines with a coupler. The tool has a needle which punctures holes in the main drip line for insertion of one end of the coupler. The tool has a slotted head which grasps the coupler facilitating the insertion of the coupler into the hole in the main line. Embodiments of the tool may also have apertures in the tool which fit around the coupler for facilitating the insertion of an end of the coupler into the open end of the drip tube.

1 Claim, 4 Drawing Sheets

METHOD FOR INSTALLING IRRIGATION DRIP LINE COUPLERS

TECHNICAL FIELD

Aspects of this disclosure relate to the field of tools utilized for fabrication of irrigation systems, and more particularly to tools and methods for installing a section of irrigation drip line to a larger diameter water supply line, where an irrigation drip line coupler connects the section of irrigation drip line to the water supply line.

BACKGROUND

Agricultural irrigation systems typically utilize water distribution lines, typically fashioned from plastic tubing, to distribute water to the plants. A distribution water line will usually have a number of sections of irrigation tubing branching off of the main water line, where each section of irrigation tubing typically has an emitter on its distal end. Each of these sections of tubing are connected to the main line by a coupler, where one end of the coupler is inserted through the wall of the main line and the other end is inserted into an open end of the section of tubing.

The installation procedure can be time consuming and result in less than satisfactory results. First, it is typical to punch a hole through the plastic distribution line with a tool which displaces the wall material to make an opening. Depending on the type of tool, wall material is displaced in the process and leaves a lip of material around the inside edge of the opening. This lip of material can interfere with the seal formed between the coupler and the wall of the distribution line, leading to water leakage around the coupler.

The second problem pertains to the insertion of a first end of the coupler into the open end of the irrigation tubing. The coupler is attached to the irrigation tubing by an interference fit between the outside diameter of the first end of the coupler and the inside diameter of the tubing, where the tubing wall is stretched to fit around the first end of the coupler. Each end of the coupler will typically have a conical configuration, where the diameter progressively gets larger from the end of the coupler to the end of the conical section, which makes it progressively more difficult to insert the first end of the coupler into the end of the tubing. If this process is done by hand, it can be difficult and time consuming to fully seat the first end of the coupler into the end of the tubing.

The third problem pertains to the insertion of the second end of the coupler into the hole formed in the distribution tubing, as described above. The coupler is retained to the distribution tubing by an interference fit between the edges of the newly formed hole and the outside diameter of the second end of the coupler which is typically identical to the first end of the coupler having a conical configuration. Typically the second end of the coupler is stabbed into the newly formed hole and manually pushed until the large conical end is enveloped within the edges defining the opening. Ideally, the coupler will be inserted sufficiently deep that the trailing edge of the conical section will seal against the inside wall of the distribution tubing. However, the lip of displaced material around the inside edge of the opening may prevent such a seal, resulting in leakage around the coupler. Applying sufficient pressure to properly seat the coupler can be difficult, particularly when the coupler is installed manually. For large installations, where thousands of couplers may be required, the problem is manifested by either a significant expenditure of time to properly install the couplers, a number of incorrectly installed couplers resulting in leakage, or a combination of both of these undesirable events.

SUMMARY

Embodiments of the presently disclosed method provide a solution to the aforementioned need. The present invention is method for utilizing a tool for installing irrigation drip line couplers into a main drip line conduit. The drip line couplers are of the type having a first male end which is inserted into the main drip line, a second male end for insertion into an end of an irrigation drip line, and a shoulder member or upset portion intermediate of the first end and the second end, where the shoulder member has an external diameter. Embodiments of the tool have a handle member, an intermediate section depending from the handle member, the intermediate section having a first end adjacent to the handle member and a second end distal from the handle member, and a head disposed at the second end. The handle member and head are each approximately perpendicular to the intermediate section. The head comprises a first leg member and a second leg member extending outwardly from the second end of the intermediate section. A slot is defined between the first leg member and the second leg member, where the slot has a width which is smaller than the external diameter of the shoulder member of the coupler, which allows the coupler to be grasped between the leg members. When it is desired to push the first male end of the coupler into the main drip line conduit, the coupler is grasped between the leg members, and the shoulder member is pushed by the leg members, until the first male end of the coupler seats within the main drip line conduit.

Embodiments of the tool also have a needle member which extends outwardly from the intermediate section, where the needle member has a pointed tip having a diameter smaller than the first male end of the drip line coupler. The needle member extends outwardly from the intermediate section, with the needle member essentially adjacent and parallel to one of the leg members, such that a coupler may be disposed within the leg members without the needle member interfering with the placement of the coupler. The needle member is utilized to puncture the main drip line conduit to form an entry hole for the first male end of the drip line coupler.

Embodiments of the tool may also comprise one or more apertures in the intermediate section. These apertures may be utilized to seat the second male end of the coupler into an end of an irrigation drip line, by slipping a coupler through the aperture until stopped by the abutment of the shoulder member of the coupler with the intermediate section.

DETAILED DESCRIPTION OF THE EMBODIMENTS

Figure 1:
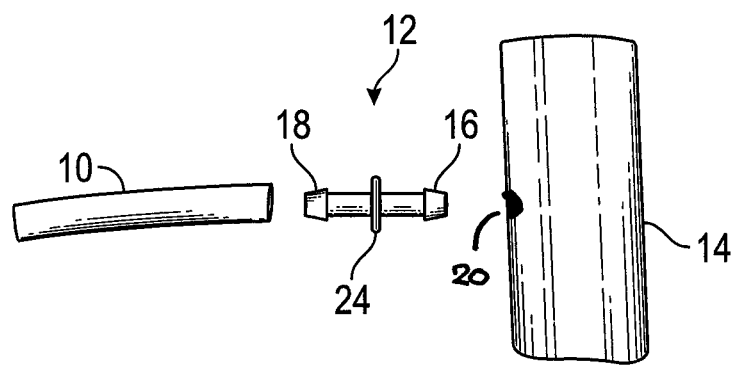
FIG. 1 depicts a configuration of a drip line, a drip line coupler, and a segment of the main drip line.

Referring specifically to the figures, FIG. 1 depicts a configuration of a drip line 10, a drip line coupler 12, and a segment of the main drip line 14. For this type of irrigation system, water is conveyed via the main drip line 14 through the drip line 10 and is dispersed at the opposite end of the drip line through a dispersal device, such as an emitter, not shown. The drip line 10 is connected to the main drip line 14 by a drip line coupler 12, such as that depicted in FIG. 1. Embodiments of typical drip line couplers 12 have a first male end 16 which is inserted into the main drip line 14 through a hole or aperture 20. The drip line coupler 12 has a second male end 18 for insertion into an end 22 of the irrigation drip line 10. Embodiments of the drip line coupler 12 have an enlarged diameter section intermediate of the first male end 16 and the second male end 18, such as shoulder member 24, which has an external diameter D which is larger than the diameters of the first male end 16 and the second male end 18. The first male end 16 and the second male end 18 may be identical, such that either end may be inserted into either the drip line 10 or the main drip line 14. Each end of the coupler 12 will typically have a conical configuration, where the diameter progressively gets larger from the end of the coupler to the end of the conical section.

Figure 2:
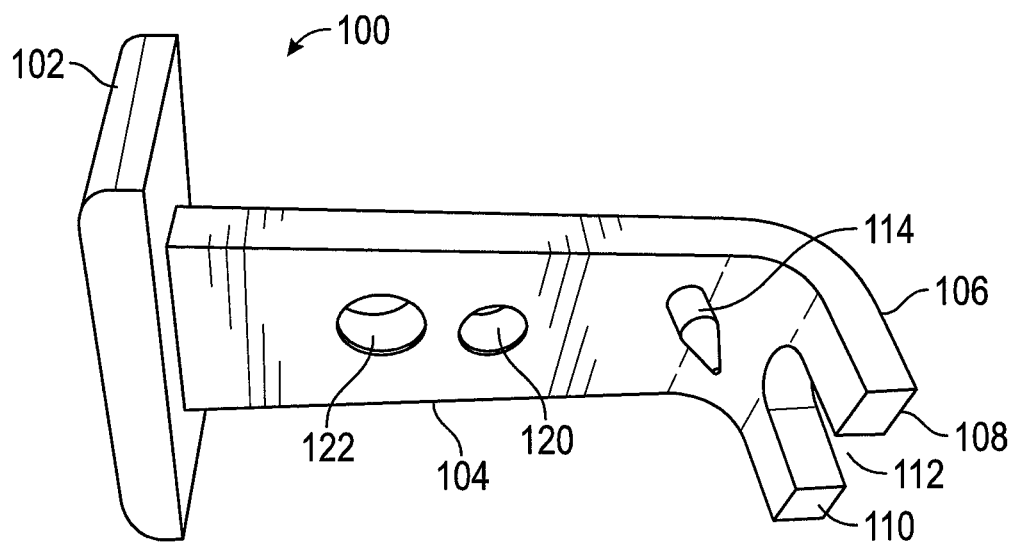
FIG. 2 shows a perspective view of an embodiment of the disclosed tool viewed from the inward facing side.
Figure 3:
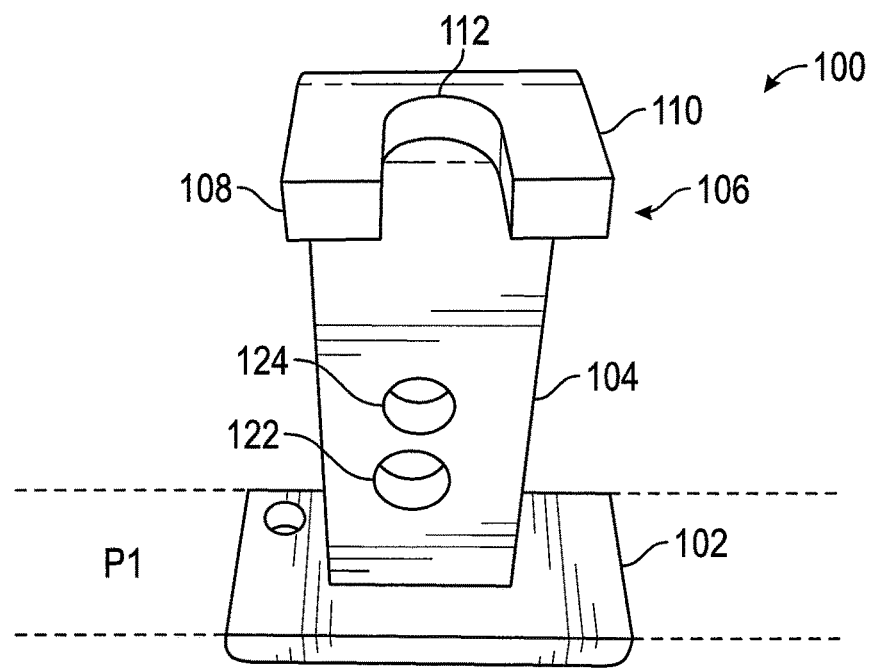
FIG. 3 shows a perspective view of an embodiment of the disclosed tool viewed from the coupler engagement end.
Figure 4:
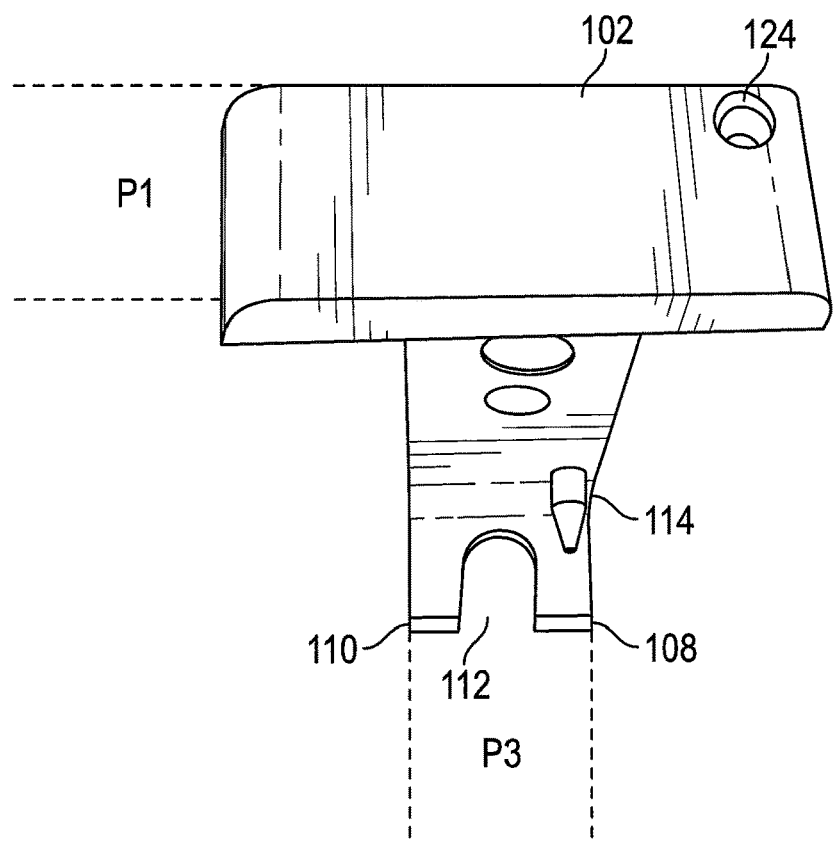
FIG. 4 shows a perspective view of an embodiment of the disclosed tool viewed from the handle.
Figure 5:
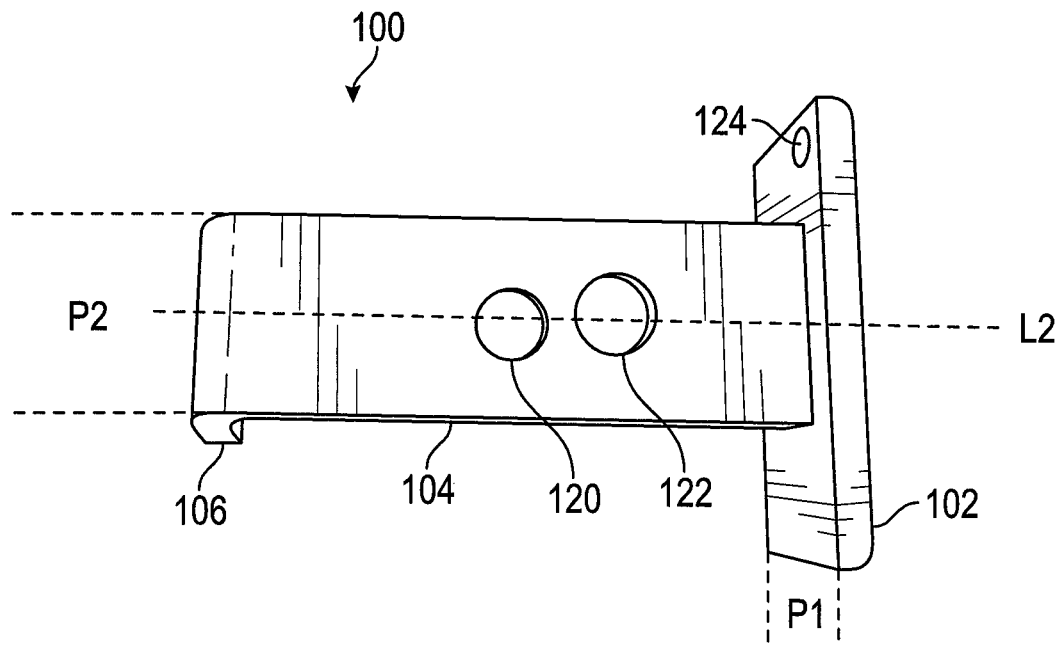
FIG. 5 shows a perspective view of an embodiment of the disclosed tool viewed from the outward facing side.

FIG. 2 shows an embodiment of the disclosed tool 100 for installing irrigation drip line couplers 12 into the main drip line 14. Embodiments of the disclosed tool 100 may comprise an integral body comprising a handle member 102, an intermediate section 104, and a head member 106. As depicted in the figures, the handle member 102 and the intermediate section 104, when considered without the head member 106, may comprise a "T" configuration, with the handle member being the cross-member and the intermediate section 104 forming the vertical member. In other words, handle member 102 defines a first planar surface $P_1$ which is approximately perpendicular to a second planar surface $P_2$ defined by the intermediate section 104. Intermediate section 104 has a central axis $L_2$ which is at the approximate longitudinal center of the intermediate section.

Likewise, the intermediate section 104 and the head member 106, when considered without the handle member 102, may comprise a "J". Head member 106 may comprise a "U" configuration comprising a first leg 108 and a second leg 110 with a slot 112 defined between the first leg and the second leg. As depicted in the figures, first leg 108 and second leg 110 extend outwardly and define a plane $P_3$ which is generally perpendicular to the plane $P_1$ defined by intermediate section 104. First leg 108 and second leg 110 each have a length, which may, for the two legs, be equivalent.

The disclosed tool 100 further comprises a needle member 114 which also extends outwardly from the intermediate section 104. As shown in the figures, the needle member 114 is generally parallel and adjacent to one of the leg members, such as first leg 108 shown in the figures. Needle member 114 typically has a length less than the length of the leg to which it is adjacent. It is to be appreciated that in this configuration, the needle member 114 does not interfere with a drip line coupler 12 which may be fitted within slot 112. In addition, because needle member 114 is adjacent to one of the legs—first leg 108 in this case—and has a shorter length, the leg acts to prevent the needle member 114 from inadvertently poking someone in the hand or making a hole in the person's pocket. The needle member 114 defines a long axis $L_3$ which is parallel to plane $P_3$. The long axis $L_3$ of needle member 114 is offset from central axis $L_2$ at the center of intermediate section 104.

Figure 7:
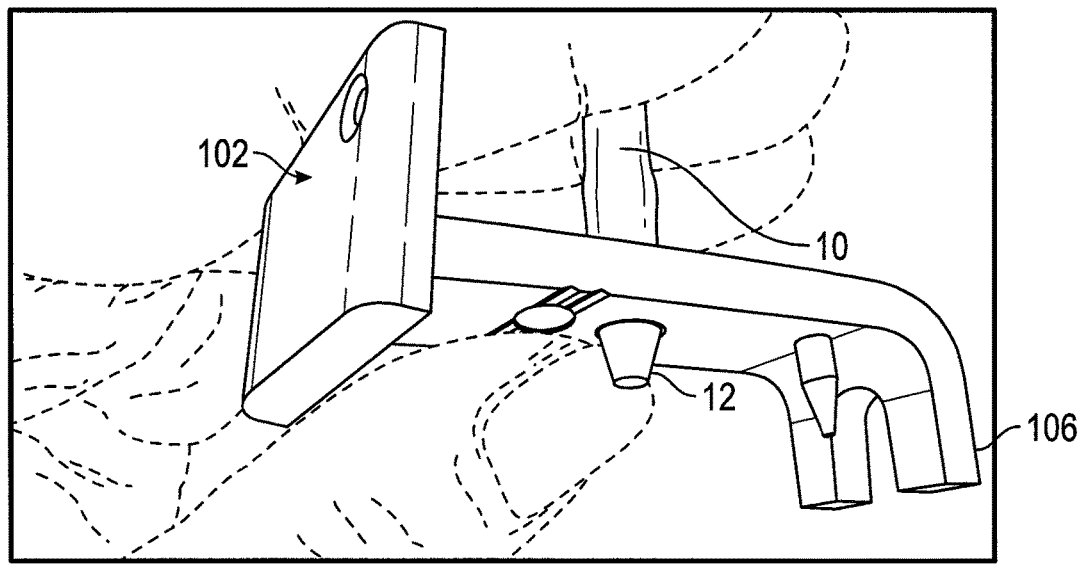
FIG. 7 depicts a side view of an embodiment of the disclosed tool showing it being used to facilitate the insertion of a drip line coupler into a segment of irrigation drip line.

Embodiments of the tool 100 may also comprise apertures 120 and 122 in the intermediate section 104 where the axis of each aperture is perpendicular to the second planar surface $P_2$. These apertures 120, 122 have diameters which are sized to be smaller than the enlarged diameter section of the coupler, such as shoulder 24. The proper size aperture 120, 122 may thereafter be utilized, as illustrated in FIG. 7, to install second male end 18 into drip line 10. Embodiments of the tool 100 may also have aperture 124 in handle member 102 which may be utilized for placement of a lanyard or other device for securing the tool.

Figure 6:
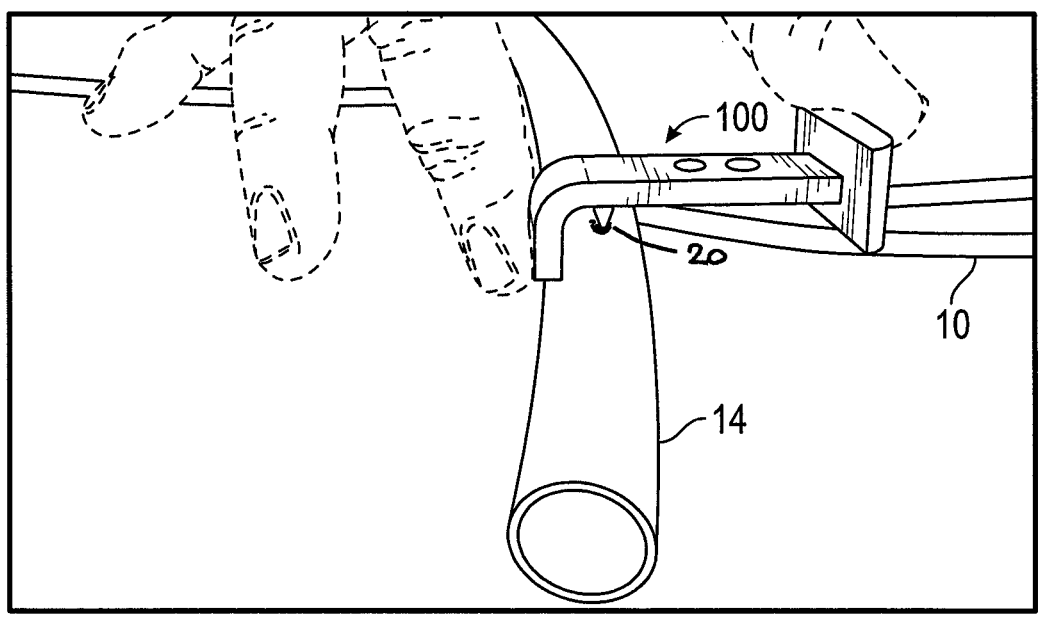
FIG. 6 depicts a side view of an embodiment of the disclosed tool showing being used to puncture a portion of the main drip line.
Figure 8:
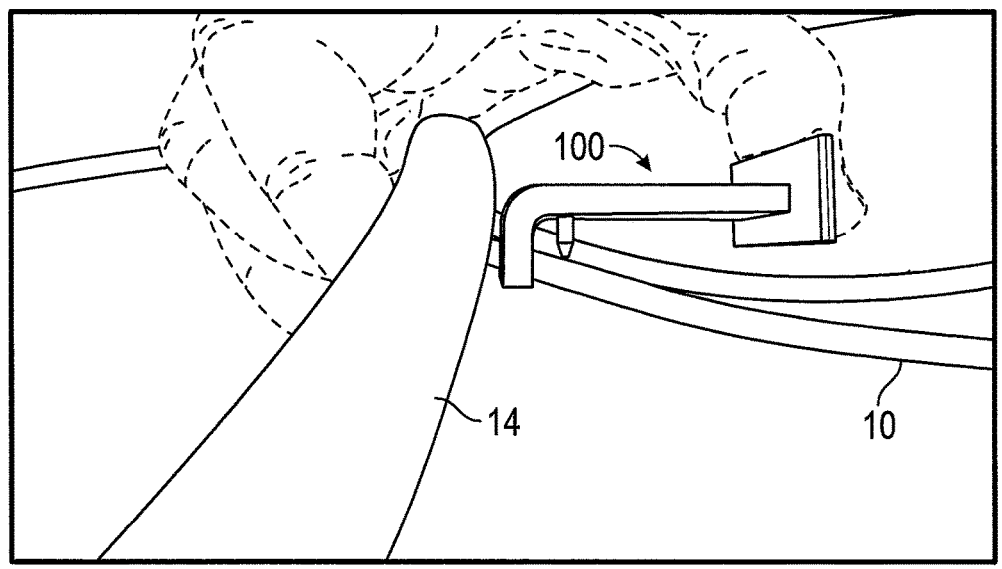
FIG. 8 depicts a side view of an embodiment of the disclosed tool showing it being used to facilitate the insertion of a drip line coupler, having an attached segment of irrigation drip line, into a main drip line.

FIGS. 6-8 illustrate the various operations which may be performed with embodiments of the tool. FIG. 6 shows an embodiment of the device 100 being utilized to puncture a hole in main drip line 14. FIG. 7 shows an embodiment of the device 100 being utilized to insert second male end 18 into an open end of drip line 10. FIG. 8 shows an embodiment of the tool 100 in which a coupler 12 has been inserted into slot 112 such that shoulder 24 is between head 106 and main drip line 14, such that pressure against handle member 102 pushes coupler 12 into the previously created hole in main drip line 14.

Embodiments of the disclosed tool may be fashioned from either metallic or high impact plastic materials.

While the above is a description of various embodiments of the present invention, further modifications may be employed without departing from the spirit and scope of the present invention. Thus the scope of the invention should not be limited according to these factors, but according to the following appended claims.

What is claimed is:

1. A method of installing a drip line to a main drip line comprising the steps of:
    puncturing the main drip line with a needle member of an integral tool creating a hole;
    attaching the drip line to a drip line coupler of the type having a first male end for insertion into the main drip line and having a second male end for insertion into an end of the drip line, and a shoulder member intermediate of the first end and the second end, the shoulder member having an external diameter;
    inserting the second male end of the drip line coupler into the end of the drip line; and
    pushing the first male end of the drip line coupler into the hole with a head member of the integral tool, the head member comprising a first leg member and a second leg member, wherein a slot is defined between the first leg member and the second leg member, wherein the slot has a width smaller than the external diameter.

* * * * *